C. H. BATTEN.
DIRECTION SIGNAL.
APPLICATION FILED AUG. 28, 1920.
1,370,400.
Patented Mar. 1, 1921.
2 SHEETS—SHEET 1.
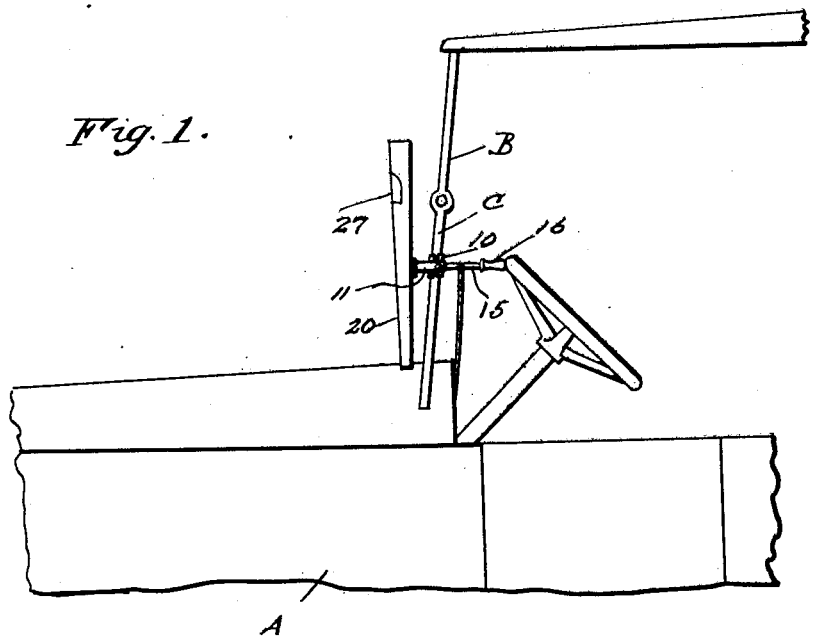
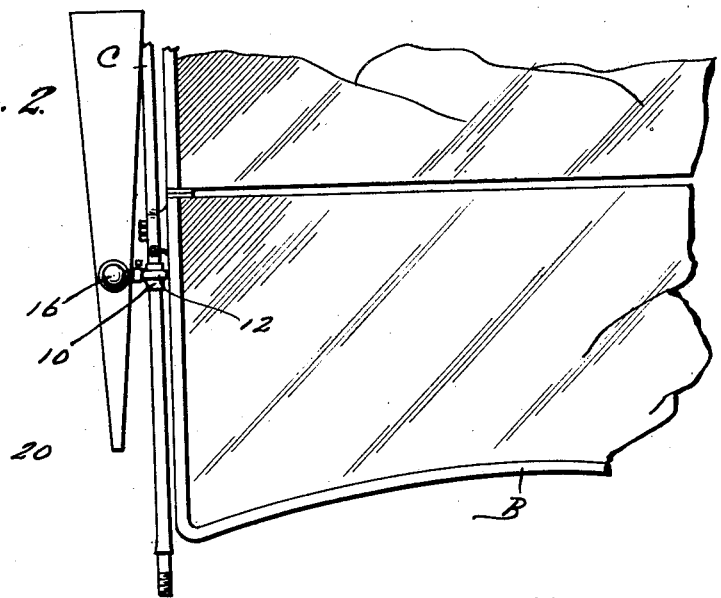

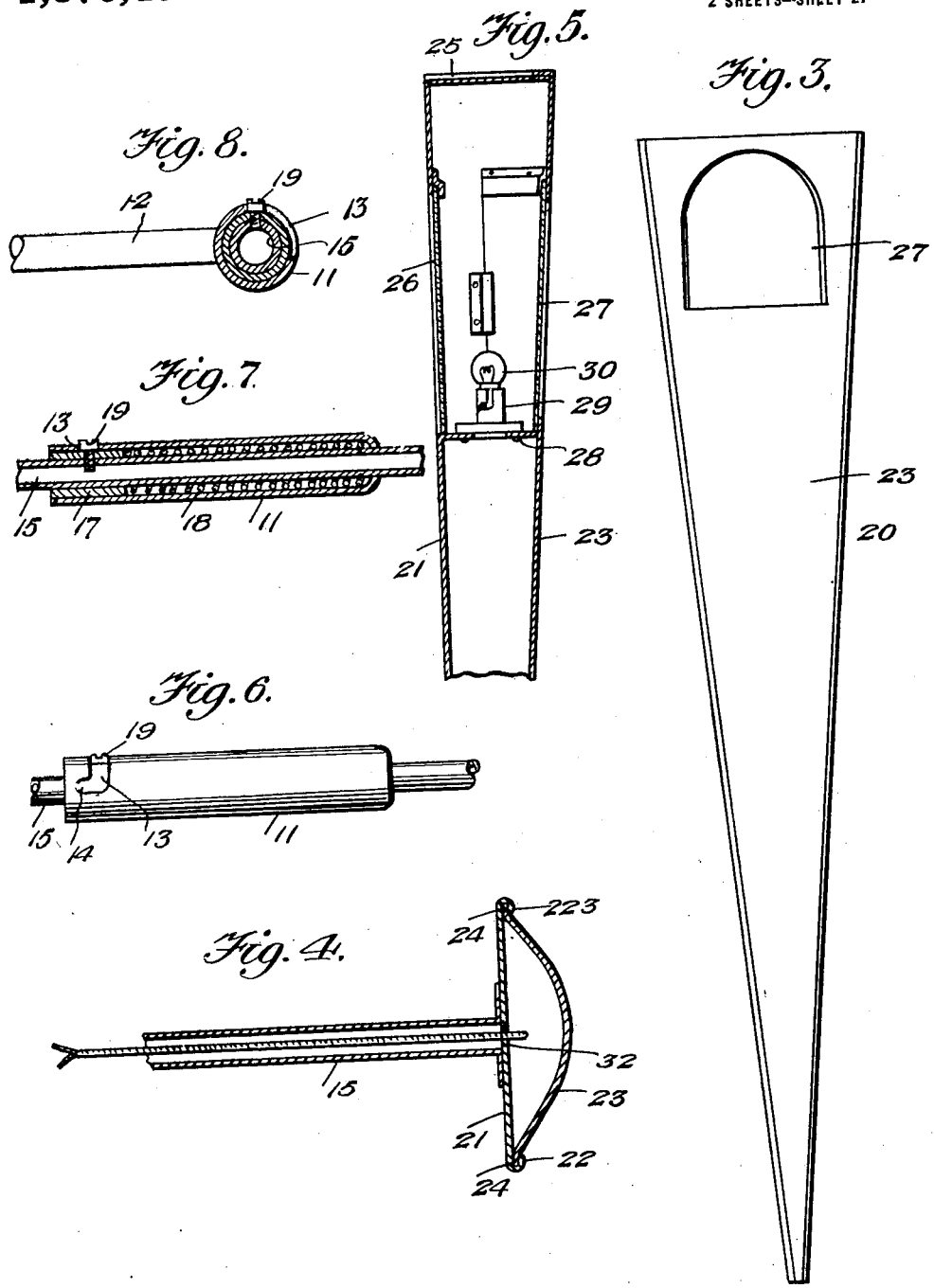

UNITED STATES PATENT OFFICE.

CLYDE H. BATTEN, OF OAKLAND, CALIFORNIA.

DIRECTION-SIGNAL.

1,370,400. Specification of Letters Patent. Patented Mar. 1, 1921.

Application filed August 28, 1920. Serial No. 406,553.

*To all whom it may concern:*

Be it known that I, CLYDE H. BATTEN, a citizen of the United States of America, residing at Oakland, in the county of Alameda and State of California, have invented new and useful Improvements in Direction-Signals, of which the following is a specification.

This invention relates to signaling devices, particularly to direction signals for vehicles, and has for its object the provision of a very simply constructed signal adapted to be clamped upon or at the side of the wind shield of an automobile and having a handle disposed within convenient reach of the driver whereby the signal arm may be swung in the desired direction to indicate to the drivers of other vehicles and to traffic officers any intended change in direction of travel.

An important object is the provision of a device of this character which is illuminated by means of an incandescent bulb whereby the signal will be capable of use at night.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which Figure 1 is a side elevation of my device in position upon a wind shield, Fig. 2 is a view looking at the wind shield from the inside of the automobile and showing my device in elevation, Fig. 3 is an elevation of the front side of my signal, Fig. 4 is a cross sectional view therethrough, Fig. 5 is a longitudinal sectional view, and Figs. 6, 7 and 8 are detail views of the guide member showing its association with the operating rod.

Referring more particularly to the drawings, the letter A designates a portion of a motor vehicle, B designates the wind shield thereof, and C designates the left side bar of the wind shield frame.

In carrying out my invention I provide a suitable clamping member 10 upon the bar C and this clamping member may be of any conventional or preferred type. Engaged within this clamping member is a support which includes a sleeve 11 and a stem 12 extending therefrom and held by the clamping member 10. This sleeve is formed adjacent one end with an arcuate slot 13 which is widened at one end, as shown at 14, to provide a retaining shoulder.

Rotatably engaged within this sleeve 11 is an operating rod 15 provided at one end with a handle 16 and carrying a collar 17 within the sleeve. A coil spring 18 surrounds the rod within the sleeve and abuts at one end against the collar 17 and at its other end against the end of the sleeve. Carried by the collar 17 is a screw 19 which is disposed within the slot 13. The function of the spring 18 is to provide partial resistance against the collar so that when the rod 15 is turned to bring the screw 19 into the widened end 14 of this slot, the screw will be retained in such widened end.

Carried by the other end of the rod 15 and in front of the wind shield or rather in front of the plane of the wind shield, is a signal arm designated broadly by the numeral 20. This arm is formed as a tapered box-like structure which includes a relatively stationary portion 21 having retaining flanges 22 at its edges, and further includes a longitudinally slidable removable cover 23 having side flanges 24 engaging beneath the flanges 22 and provided at one end, the rear end, with flanges 25 engaging against the end of the stationary portion 21. This arm is preferably painted red.

In order that the device may be used at night, the arm 20, that is both the stationary portion 21 and the cover 23, are formed with registering openings 26 and 27, respectively, and the stationary portion 21 is formed adjacent the opening 26 therein, with an ear 28 bent to extend into engagement with the cover 23 and secured upon this ear, which is apertured, is a suitable socket 29 within which is engaged an incandescent bulb 30. The lead wires 31 leading to the socket 29 pass through the arm 20 and emerge therefrom through a hole 32 and are of course connected with any suitable source of current. When the device is used at night the current is of course turned on by any suitable switch, not shown, so that the arm 20 will be efficiently illuminated.

In the operation of the device it will be seen that in normal position the arm 20 is disposed vertically and indicates that the vehicle is to travel straight ahead. When the operator desires to signal an intended change in direction of travel, he grasps the handle 16 and consequently the rod so as to swing the arm 20 into horizontal position which signals to the drivers of other vehicles and to the traffic officers that a change in direction is going to be made. When the arm is thus swung the screw 19 will snap into the widened portion 14 of the slot 13 and be thus held so that the operator may have both hands free for controlling the steering wheel. When the desired turn has been made, it is merely necessary that the operator press upon the handle and push it slightly to compress the spring so that the screw 19 will pass out of the widened end 14 of the slot 13 whereupon the arm 20 will gravitationally descend into normal or vertical position.

From the foregoing description and a study of the drawings it will be apparent that I have thus provided a very simply constructed and easily operated signal device which involves very little effort in its manipulation and which will yet be positive in action and highly efficient.

While I have shown and described the preferred embodiment of my invention it is of course to be understood that I reserve the right to make such changes in the form, construction, and arrangement of parts as will not depart from the spirit of the invention or the scope of the subjoined claims.

Having thus described my invention, I claim:

1. A signal device comprising a bearing sleeve clamped upon one side of a wind shield and having an arcuate slot widened at one end to define a retaining shoulder, a rod journaled through said sleeve and carrying a collar therein, a projection on said sleeve disposed within said slot, a spring surrounding the rod within the sleeve and abutting against one end of the sleeve and against said collar whereby to hold said projection behind said shoulder when the projection is engaged within the widened end of said slot, a handle on one end of said rod, and a signal arm on the other end of said rod, one end of said arm being heavier than the other whereby the arm will drop to signaling position when said projection is released from the widened end of the slot.

2. A movable signal arm comprising a tapered box-like casing including a relatively stationary portion having its edges formed with retaining flanges, said casing further including a cover slidably engaged upon the relatively stationary portion and having side flanges engaging beneath said first named flanges, said stationary portion and said cover being formed with registering openings and the stationary portion being formed at one edge of the opening therein with an ear bent at right angles and extending to said cover, said ear being adapted to support an illuminating device.

In testimony whereof I affix my signature.

CLYDE H. BATTEN.